United States Patent Office 3,632,689
Patented Jan. 4, 1972

3,632,689
ARYLENE PHOSPHINITES
Ludwig Maier, Zurich, Switzerland, assignor to
Monsanto Company, St. Louis, Mo.
No Drawing. Filed Nov. 20, 1967, Ser. No. 684,490
Claims priority, application Switzerland, Dec. 13, 1966,
17,943/66
Int. Cl. C07f 9/46; C07d 105/02
U.S. Cl. 260—930                                6 Claims

ABSTRACT OF THE DISCLOSURE

Arylene phosphinites of the formula $R(OPR'_2)_n$ where R is an arylene group, R' is an alkyl group linked by carbon to the phosphours and $n$ is an integer of 2 to 10, and a process for making by reacting compounds of the formulas $R(OH)_n$ and $R'_2PNR''_2$ to split off ammonia or an amine. The arylene phosphinites are useful as hydraulic fluids, heat transfer agents and lubricants.

---

This invention relates to arylene phosphinites of the general formula $$R(OPR'_2)_n$$

in which R signifies a possibly substituted and/or ethylenically or acetylenically unsaturated arylene group which is at least divalent. R' signifies a possibly substituted and/or ethylenically or acetylenically unsaturated hydrocarbon group or a heterocyclic group and $n$ stands for 2–10, and to a process for preparing these compounds.

The process is characterized in that a hydroxyl compound, having at least two aromatically linked hydroxyl groups, of the general formula $$R(OH)_n$$

in which R and $n$ are defined as above, and an aminophosphine of the general formula $$R'_2PNR''_2$$

in which R' is defined as above and $NR''_2$ signifies an amino group which is derived from ammonia, a primary amine or a secondary amine having a lower boiling point than the hydroxyl compound to be reacted, are heated until substantially no more ammonia or amine evolves from the reaction mixture.

The reaction of aminophosphines with, for example, a difunctional alcohol yielding the corresponding aliphatic diphosphinite, is described in U.S. patent application Ser. No. 515,720, filed Dec. 22, 1965, now abandoned by the same applicant. The alkylene diphosphinite rearrange on heating to the corresponding ditertiary alkylene diphosphine dioxides; however, it has been found that arylene diphosphinites, undiscovered up to now, are very temperature resistant compounds possessing a relatively wide liquid range. They are consequently well suited as noncombustible hydraulic oils, heat transfer agents, lubricants and additives to lubricants, such as antioxidants.

The reaction of invention proceeds according to the equation $$nR'_2PNR''_2 + R(OH)_n \rightarrow R(OPR'_2)_n + nHNR''_2$$

The preparation of aminophosphines from halophosphines by exchanging the halogen atom for an amino group is well known. Thus, the groups R' depend on the available organic halophosphines. Numerous organic halophosphines, suitable for the preparation of the starting compounds, are well known. Known examples for both the groups R' are dimethyl, diethyl, di-n-propyl, di-isopropyl, di-n-butyl, di-iso-butyl, dicyclohexyl, diphenyl, di-2-tolyl, di-4-tolyl, bis-2,4,5-trimethylphenyl and di-1-naphthyl. These groups can also bear substituents. Known examples are bis-trifluoromethyl, bis-perfluoropropyl, di-2-chlorophenyl, di-4-chlorophenyl, bis-pentafluorophenyl, di-4-nitrophenyl and bis-4-dimethylaminophenyl. These groups, moreover, can also be unsaturated. Known examples are divinyl and bis-trifluorovinyl. It is understood that the two groups can be different from each other. Known examples are methyl and ethyl, methyl and chloromethyl, methyl and phenyl, ethyl and phenyl, phenyl and tolyl, phenyl and 2,4,5-trimethylphenyl, phenyl and 4-bromophenyl and phenyl and 4-methoxyphenyl. Known halophosphines, in which two groups R', taken together, signify members of a heterocyclic group, are 1-iodophosphatetrafluorocyclopentane and 5,10 - dihydro-10-chlorophenophosphazine. Any occurring organic halophosphine can be converted via the corresponding aminophosphine into the corresponding arylene phosphinite according to the process of invention. No substituents in occuring substituted diorganohalophosphines or cycloorganohalophosphines are imaginable which would hinder the reaction of invention. Normally, the R' group will have not more than 24 carbon atoms and many useful compounds can be made where R' has not more than 8 carbon atoms.

The amino group $NR''_2$ has an auxiliary function only, since it is split off in the reaction. The $NH_2$ group or the groups of easily volatile amines, especially the methylamino, dimethylamino, ethylamino, diethylamino, n-propylamino and iso-propylamino groups therefore are preferred. The $NH_2$ group, as a rule, is only found in phosphines having strong electron-with-drawing substituents. Well known examples are $(C_6F_5)_2PNH_2$ and $$(CF_3)_2PNH_2.$$

The reaction of halophosphines with ammonia or primary amines, as is known, leads easily to further substitution in the amino group. However, the resulting compounds such as, e.g. $R'_2P$—NH—$PR'_2$, $$R'_2P\text{—}N\text{—}PR'_2 \text{ and } R'_2P\text{—}N\text{—}PR'_2$$
$$\phantom{R'_2P\text{—}N\text{—}}\underset{PR'_2}{|} \phantom{\text{ and } R'_2P\text{—}N\text{—}}\underset{CH_3}{|}$$

are just as well suited for starting compounds in the present process.

In such case, the reaction of invention proceeds, for example, according to the equation $$n(R'_2P)_3N + 3R(OH)_n \rightarrow 3R(OPR'_2)_n + nNH_3$$

The $R''_2N$— group consequently can be an optional amino group if the amine formed in the reaction is more volatile than the hydroxyl compound to be reacted and no steric hindrance occurs. The secondary and tertiary aliphatic, cycloalpihatic and aromatic amino groups therefore preferably possess on their α-carbon atoms, or in the ortho positions, respectively, hydrogen atoms.

All hydroxyl compounds showing at least two aromatically linked hydroxyl groups are suitable as reactants. The hydroxyl groups can be found on the same aromatic nucleus like, e.g. in the compounds hydroquinone, pyrocatechin, resorcin, pyrogallol, phloroglucin, hydroxyhydroquinone, tetrahydroxybenzene, pentahydroxybenzene, hexahydroxybenzene, 1,2 - dihydroxynaphthalene, 2,3 - dihydroxynaphthalene, 1,2,4 - trihydroxynaphthalene and 2,5 - dihydroxybiphenyl or on different aromatic nuclei like, e.g. in the compounds 1,8-dihydroxynaphthalene, 1,4,5,8 - tetrahydroxynaphthalene, 2,2' - dihydroxybiphenyl, 2,4' - dihydroxybiphenyl, 3,3'-dihydroxybiphenyl, 3,5,3',5' - tetrahydroxybiphenyl and 2,2',2'' - trihydroxy-m-terphenyl. From the cited examples, it is apparent that several benzene nuclei can be attached directly together as, e.g. in diphenyl and terphenyl or that several benzene nuclei can be condensed as, e.g. in naphthalene, anthracene and phenanthrene. Moreover, it is evident that the hydroxyl groups can arise in different possible positions.

The benzene nuclei can show alkyl groups as substituents, whereby often a decrease of the melting point is achieved. Examples are 4-n-butylresorcinol, 3,4,5-trihydroxy-1-n-propylbenzene, 1 - methyl - 2,6 - dihydroxynaphthalene, and 2 - ethyl - 1,3-dihydroxynaphthalene. A greater liquid range is caused also by alkoxy, silyl and siloxy groups. Examples are pyrogallol - 1 - methyl ether, 3,4 - dihydroxy - 1,2 - dimethoxybenzene and trimethylsiloxyhydroquinone.

The fluorine atom is a further expedient substituent which, as a rule, lowers the melting point of the end products. One or several hydrogen atoms of the aromatic nucleus can be replaced.

Instead of being attached directly together, the benzene nuclei can be linked also through an alkylene like, e.g. in the compounds 2,4 - bis-hydroxyphenyl-methane, 2,4'-bis-hydroxyphenyl-methane, 3,3'-bis-hydroxyphenyldifluoromethane, 3,3'-bis-hydroxyphenyl-methane and 3, 3',3'',3'''-tetrakis-hydroxyphenylmethane, or through an alkenylene like, e.g. in 4,4'-dihydroxystilbene, or through an alkynylene like, e.g. in 2,2'-dihydroxydiphenylacetylene, or through an oxygen atom like, e.g. in 3,3'-dihydroxydiphenyl ether, or through a sulfur atom like, e.g. in 2,5,2',5' - tetrahydroxydiphenyl sulfide, 3,3' - dihydroxydiphenyl disulfide, or through a SO group like, e.g. in 4,4' - dihydroxydiphenylsulfoxide, or through a $SO_2$ group like, e.g. in 3,3'-dihydroxydiphenylsulfone.

Therefore, under the term "arylene" is understood any divalent organic group derived from an at least dihydric phenolic compound. In particular, the term "arylene" includes groupings such as arylene-R*-arylene, where R* is a straight chain or branched chain aliphatic group which can show ethylenic or acetylenic unsaturation; arylene-O-arylene, arylene-S-arylene, arylene-S-S-arylene, arylene-SO-arylene and arylene-$SO_2$-arylene. It should be noted that the sequence of aromatic groups and, for example, linking aliphatic groups, oxygen atoms, sulfur atoms, SO groups or $SO_2$ groups can repeat several times. Especially valuable products contain the grouping phenylene-[O-phenylene]m, where m is an integer of 1 to 4. Normally, the R group will have not more than 24 carbon atoms, but it can have more.

In practicing the reaction, a mixture of the aminophosphine and the hydroxyl compound in the calculated proportion is heated until no more substantial amount of ammonia or amine evolves. The temperature is increased from room temperature up to such a temperature at which the evolution of ammonia or amine is considered to be sufficiently great. Temperatures of about 100° C. and more are expediently employed. The reaction time can be several minutes to several hours according to the kind of the amine to be cleaved and to the temperature employed. The reaction may also be carried out in an inert solvent; however, it is preferred that the cleaved amine escapes as fast as possible and completely from the reaction mixture. Many end products are distillable in vacuo. Others can be purified by crystallization or by using extraction methods.

EXAMPLE 1

A mixture of 21.7 g. (0.1 mol) of $(n-C_4H_9)_2PN(C_2H_5)_2$ and 5.5 g. (0.05 mol) of hydroquinone is heated at 140° C. for 2 hours. 6.1 g. (83.5%) of diethylamine have distilled off already after 15 minutes. After a small forerun of starting material (0.3 g., B.P. 65–72° C./0.1 mm.) there are obtained 17 g. (83.5%) of phenylene-1,4-bis-(di-n-butylphosphinite); B.P. 180–183° C./0.1 mm., $P^{31}$ chemical shift —134.6 p.p.m.

Analysis.—Calc'd for $C_{22}H_{40}O_2P_2$ (398.5) (percent): C, 56.30; H, 10.11. Found (percent): C, 64.13; H, 10.06.

EXAMPLE 2

A mixture of 21.7 g. (0.1 mol) of diethylamino-di-n-butylphosphine and 5.5 g. (0.05 mol) of resorcin is heated at 140° C. for 1 hour. 6 g. (82%) of diethylamine escape. The reaction mixture is distilled. After a small forerun (0.3 g., B.P. 40–60° C./0.1 mm.) there are obtained 11.5 g. (56.2%) of phenylene-1,3-bis-(di-n-butylphosphinite); BP. 170–180° C./0.1 mm. $P^{31}$ chemical shift —133.0 p.p.m. (traces of impurities at —182.4 and —130.0 p.p.m.).

Analysis.—Calc'd for $C_{22}H_{40}O_2P_2$ (398.5) (percent): C, 66.3; H, 10.11; O, 8.03. Found (percent): C, 65.7; H, 10.28; O, 8.43.

EXAMPLE 3

A mixture of 21.7 g. (0.1 mol) of diethylamino-di-n-butylphosphine and 9.9 g. (0.05 mol) of 4,4'-dihydroxybiphenyl is heated at 140° C. for 2 hours. 6.4 g. (87.5%) of diethylamine escape. The reaction mixture is distilled. After a forerun (3.6 g., B.P. 72–130° C./0.1 mm.) there are obtained 15.1 g. (62.4%) of biphenylene-4,4'-bis-(di-n-butylphosphinite); B.P. 240–245° C./0.1 mm. $P^{31}$ chemical shift —132.7 p.p.m. (impurities at —181.8 p.p.m.).

Analysis.—Calc'd for $C_{28}H_{44}O_2P_2$ (484.5) (percent): C, 69.39; H, 9.15; O, 6.60. Found (percent): C, 70.02; H, 10.8; O, 6.45.

EXAMPLE 4

A mixture of 5.7 g. (0.025 mol) of bisphenol A and 10.8 g. (0.05 mol) of diethylamino-di-n-butylphosphine is heated at 150° C. for 4 hours. 3.42 g. (93.7%) diethylamine escape. The residue does not distill in vacuo up to 350° C. Decomposition occurs above this temperature. Yield 11.1 g. (84.5%) of liquid 2,2-diphenylpropylene-4,4'-bis-(di-n-butylphosphinite of the formula $(n-C_4H_9)_2POC_6H_4C(CH_3)_2C_6H_4OP(C_4H_9-n)_2$ chemical shift $P^{31}$ —130.7 p.p.m. (traces of impurities at —179.6 and —139.8 p.p.m.).

Analysis.—Calc'd for $C_{31}H_{50}O_2P_2$ (526.65) (percent): C, 70.69; H, 9.56. Found (percent): C, 71.09; H, 9.51.

The embodiments of the invention in which an exclusive property or privilege is claimed are defined as follows:

1. An arylene phosphinite of the formula $R(OPR'_2)_n$ wherein R is an arylene or bis-arylene group having up to 24 carbon atoms which is at least divalent, R' is an alkyl group having up to 24 carbon atoms, and n is an integer of 2–10.

2. An arylene phosphinite of claim 1 wherein R is arylene hydrocarbon and R' is an alkyl group having up to 8 carbon atoms.

3. An arylene phosphinite of claim 1 wherein R is phenylene-1,4, R' is n-butyl and n is 2.

4. An arylene phosphinite of claim 1 wherein R is phenylene-1,3, R' is n-butyl and n is 2.

5. An arylene phosphinite of claim 1 wherein R is biphenylene-4,4', R' is n-butyl and n is 2.

6. An arylene phosphinite of claim 1 wherein R is 2,2-bis(p-phenylene)isopropane.

References Cited

UNITED STATES PATENTS 3,159,533 12/1964 Nelson _____ 260—930 X
3,185,721 5/1965 Schrader _____ 260—971
3,239,464 3/1966 Matson et al. _____ 260—930 X CHARLES B. PARKER, Primary Examiner
A. H. SUTTO, Assistant Examiner U.S. Cl. X.R.

252—49.8, 77, 400; 260—448.8 R, 551 P, 927 R